United States Patent
Keysers et al.

(10) Patent No.: US 12,468,965 B2
(45) Date of Patent: Nov. 11, 2025

(54) ACTIONABLE SUGGESTIONS FOR ACTIVITIES

(71) Applicant: GOOGLE LLC, Mountain View, CA (US)

(72) Inventors: Daniel M. Keysers, Stallikon (CH); Victor Carbune, Zurich (CH); Thomas Deselaers, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/426,325

(22) Filed: Jan. 29, 2024

(65) Prior Publication Data

US 2024/0169221 A1    May 23, 2024

Related U.S. Application Data

(63) Continuation of application No. 17/102,108, filed on Nov. 23, 2020, now Pat. No. 11,887,016, which is a (Continued)

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS 7,311,608 B1    12/2007    Danieli
9,043,329 B1    5/2015    Patton et al.
(Continued)

FOREIGN PATENT DOCUMENTS

CN    101334865    12/2008
CN    102378106    3/2012
(Continued)

OTHER PUBLICATIONS

Gal-Tzur, Ayelet, et al. "The potential of social media in delivering transport policy goals." Transport Policy 32 (2014): 115-123. (Year: 2014).*
(Continued)

*Primary Examiner* — Hal Schnee
(74) *Attorney, Agent, or Firm* — Gray Ice Higdon

(57) ABSTRACT

Methods, systems, and apparatus, including computer programs encoded on a computer storage medium, for providing actionable suggestions are disclosed. In one aspect, a method includes receiving (i) an indication that an event detection module has determined that a shared event of a particular type is presently occurring or has occurred, and (ii) data referencing an attribute associated with the shared event. The method includes selecting, from among multiple output templates that are each associated with a different type of shared event, a particular output template associated with the particular type of shared event detected by the module. The method generates a notification for output using at least (i) the selected particular output template, and (ii) the data referencing the attribute associated with the shared event. The method then provides, for output to a user device, the notification that is generated.

16 Claims, 8 Drawing Sheets

Related U.S. Application Data continuation of application No. 15/340,284, filed on Nov. 1, 2016, now Pat. No. 10,846,612.

(56) References Cited

U.S. PATENT DOCUMENTS

| | | | |
|---|---|---|---|
| 9,106,710 | B1 | 8/2015 | Feimster |
| 9,898,464 | B2 | 2/2018 | Okamoto et al. |
| 10,163,058 | B2 | 12/2018 | Nitz et al. |
| 10,846,612 | B2 | 11/2020 | Keysers et al. |
| 2009/0100351 | A1 | 4/2009 | Bromenshenkel |
| 2009/0319472 | A1 | 12/2009 | Jain et al. |
| 2013/0031475 | A1 | 1/2013 | Maor et al. |
| 2013/0143535 | A1 | 6/2013 | Leppanen et al. |
| 2013/0170819 | A1 | 7/2013 | Dykeman et al. |
| 2013/0173728 | A1 | 7/2013 | Starenky et al. |
| 2013/0212176 | A1 | 8/2013 | Koulomzin et al. |
| 2013/0218967 | A1 | 8/2013 | Chau et al. |
| 2014/0012918 | A1 | 1/2014 | Chin et al. |
| 2014/0089320 | A1 | 3/2014 | Baldwin et al. |
| 2014/0250175 | A1* | 9/2014 | Baldwin ............... H04L 67/306 709/204 |
| 2014/0267081 | A1* | 9/2014 | Kreek .................... G06F 3/011 345/173 |
| 2014/0280660 | A1 | 9/2014 | Khandewale et al. |
| 2014/0372902 | A1* | 12/2014 | Bryant ............... G06Q 30/0267 715/748 |
| 2015/0032771 | A1 | 1/2015 | Berio |
| 2015/0039616 | A1 | 2/2015 | Rolston |
| 2015/0080027 | A1 | 3/2015 | Amrhein et al. |
| 2015/0127392 | A1* | 5/2015 | Shivakumar .......... G06Q 50/01 705/5 |
| 2015/0154263 | A1 | 6/2015 | Boddhu et al. |
| 2015/0356516 | A1* | 12/2015 | Kagan ................ G06Q 10/1095 705/7.19 |
| 2016/0105526 | A1 | 4/2016 | Kritt et al. |
| 2016/0171556 | A1 | 6/2016 | Grewe |
| 2016/0275526 | A1 | 9/2016 | Becanovic |
| 2016/0285808 | A1 | 9/2016 | Franklin |
| 2016/0294894 | A1* | 10/2016 | Miller ............... G06F 16/24578 |
| 2016/0323219 | A1 | 11/2016 | Brecx |
| 2016/0360382 | A1 | 12/2016 | Gross et al. |
| 2017/0039770 | A1 | 2/2017 | Lanier |
| 2017/0285758 | A1 | 10/2017 | Hastings |
| 2018/0004724 | A1 | 1/2018 | Ramesan |
| 2018/0102999 | A1 | 4/2018 | Keysers et al. |
| 2019/0026165 | A1* | 1/2019 | Shida .................... G06Q 50/01 |
| 2020/0082168 | A1 | 3/2020 | Fathi et al. |
| 2021/0073663 | A1 | 3/2021 | Keysers |

FOREIGN PATENT DOCUMENTS

| | | |
|---|---|---|
| CN | 103370690 | 10/2013 |
| CN | 104102328 | 10/2014 |
| CN | 104199904 | 12/2014 |
| CN | 104217096 | 12/2014 |
| CN | 104735617 | 6/2015 |
| CN | 105190597 | 12/2015 |
| CN | 105306575 | 2/2016 |
| CN | 105897570 | 8/2016 |
| CN | 106027621 | 10/2016 |
| DE | 102014107571 | 12/2014 |
| KR | 20040035521 | 4/2004 |
| WO | 2015120413 | 8/2015 |

OTHER PUBLICATIONS

Zhou, Xiangmin, and Lei Chen. "Event detection over twitter social media streams." The VLDB journal 23.3 (2014): 381-400. (Year: 2014).*

Liao, G. et al.; "An effective latent networks fusion based model for event recommnedation in offline ephemeral social networks;" Proceedings of the 22nd ACM International Conference on Information & Knowledge Management; 6 pages; 2013.

Chinese Patent Office; Office Action issued in Application No. 201710906551.8 dated Jul. 2, 2020 Jul. 2, 2020.

PCT International Preliminary Report on Patentability in International Application No. PCT/US2017/052376 dated Apr. 25, 2019. 8 pages. Apr. 25, 2019.

Office Action issued in British Application No. GB 1715646.4 mailed Feb. 19, 2018. 7 pages. Feb. 19, 2018.

Office Action issued in British Application No. GB1715671.2 mailed on Feb. 14, 2018. 5 pagesl Feb. 14, 2018.

International Search Report and Written Opinion in International Application No. PCT/US2017/052376 mailed on Nov. 8, 2017. 14 pages. Nov. 8, 2017.

Conger, "Facebook says it's not making friend suggestions based on your location after all," TechCrunch, Jun. 28, 2016 [retrieved on Oct. 6, 2016]. Retrieved from the Internet: URL<https://techcrunch.com/2016/06/28/facebook-says-its-not-making-friend-suggestions-based-on-your-location-after-all/>, 7 pages. Jun. 28, 2016.

Cook et al., "Detection of Social Interaction in Smart Spaces," Cybern Syst., 41(2):90-104, Feb. 1, 2010 Feb. 1, 2010.

Do et al., "Human Interaction Discovery in Smartphone Proximity Networks," Personal and Ubiquitous Computing 17 (3): 413-431, Mar. 2013. Mar. 2013.

Dong et al., "Multiscale event detection in social media," Data Min Knowl Disc, 29:1374-1405, Jun. 2015 Jun. 2015.

Li et al., "Multi-Modal In-Person Interaction Monitoring Using Smartphone and On-Body Sensors," 2013 IEEE International Conference on Body Sensor Networks, pp. 1-6, May 2013 May 2013.

China Patent Office; Notice of Allownace issued in Application No. 201710906551.8; 5 pages; dated Feb. 25, 2021.

German Patent and Trademark Office; Office Action issued in Application No. 10 2017 122 379.7; 14 pages; dated Dec. 18, 2024.

China Patent Office; Notice of Allowance issued in Application No. 202110516973.0, 5 pages; dated Apr. 1, 2024.

* cited by examiner

700

702 RECEIVE: (I) INDICATION THAT EVENT DETECTION MODULE HAS DETERMINED A SHARED EVENT OF A PARTICULAR TYPE IS PRESENTLY OCCURRING OR HAS OCCURRED, AND (II) DATA REFERENCING AN ATTRIBUTE ASSOCIATED WITH THE SHARED EVENT

704 SELECT A PARTICULAR OUTPUT TEMPLATE ASSOCIATED WITH THE PARTICULAR TYPE OF SHARED EVENT THAT THE EVENT DETECTION MODULE HAS DETERMINED IS PRESENTLY OCCURRING OR HAS OCCURRED

706 GENERATE A NOTIFICATION FOR OUTPUT USING AT LEAST: (I) THE PARTICULAR OUTPUT TEMPLATE ASSOCIATED WITH THE PARTICULAR TYPE OF SHARED EVENT DETERMINED TO BE PRESENTLY OCCURRING OR DETERMINED TO HAVE ALREADY OCCURRED, AND (II) THE DATA REFERENCING THE ATTRIBUTE ASSOCIATED WITH THE SHARED EVENT

708 PROVIDE THE NOTIFICATION THAT IS GENERATED USING AT LEAST: (I) THE PARTICULAR OUTPUT TEMPLATE, AND (II) THE DATA REFERENCING THE ATTRIBUTE ASSOCIATED WITH THE SHARED EVENT OF THE PARTICULAR TYPE.

FIG. 7

ACTIONABLE SUGGESTIONS FOR ACTIVITIES

BACKGROUND

Activities that connect a group of users often result in situations where it would be useful to receive notifications indicating that certain members of a user group are participating in the same event. In the context of computing systems, the notification can be received at a user device while the event is occurring or at a later time after the event has concluded. It may also be useful to receive, during or after the event, notifications that include suggestions for activities or actions associated with the event.

SUMMARY

A computing system is described that automatically detects that a particular event, such as a shared event, is taking place or took place. This specification describes processes for receiving and analyzing data signals from user devices associated with individual users within a user group to detect the occurrence of a shared event. In response to automatically detecting the occurrence of a shared event, the computing system suggests one or more activities that are, at least in part, related to or associated with the shared event. Suggesting the one or more activities can include, for example, the computing system analyzing data signals provided by devices of the users to determine an attribute associated with the shared event. Values of the data signals can indicate that the one or more users are participating in, or at least are associated with, a shared event of a particular type. Accordingly, actionable suggestions for one or more activities associated with the determined shared event type can be provided to the users.

In one innovative aspect of the specification, a computer-implemented method is described, that includes receiving (i) an indication that an event detection module has determined that a shared event of a particular type is presently occurring or has occurred, and (ii) data referencing an attribute associated with the shared event. The method includes, selecting, by a computing system, from among multiple output templates that are each associated with a different type of shared event, a particular output template associated with the particular type of shared event that the event detection module has determined is presently occurring or has occurred, and generating, by the computing system, a notification for output using at least (i) the particular output template associated with the particular type of shared event determined to be presently occurring or determined to have already occurred, and (ii) the data referencing the attribute associated with the shared event. The method further includes, providing, for output to a user device, the notification that is generated using at least (i) the particular output template, and (ii) the data referencing the attribute associated with the shared event of the particular type.

In one implementation, the method further includes providing, by the computing system and to one or more user devices, at least one activity suggestion associated with the shared event, the at least one activity suggestion being based, in part, on at least one of: (i) the particular type of the shared event; or (ii) the data referencing the attribute associated with the shared event. In one implementation, selecting the particular output template associated with the particular type of shared event includes, using, by the computing system, one or more machine-learning algorithms based on analysis of the received data referencing the attribute associated with the shared event; and in response to using the one or more machine-learning algorithms, determining, by the computing system, the particular output template to be selected.

In one aspect of this implementation, at least one machine-learning algorithm receives data referencing a plurality of attributes associated with the shared event, the plurality of attributes being utilized, during execution of the at least one machine-learning algorithm, to train a template model used by the computing system to select the particular output template. In another aspect of this implementation, further method further includes, training, by the computing system, the template model to predict the particular output template to be selected, the template model being trained to predict the particular output template based on a probability metric associated with an activity suggestion exceeding a threshold probability metric.

In one implementation, generating the notification for output includes, providing, by the computing system and to a particular user, an activity suggestion and an application program associated with the activity suggestion, the application program being configured for use on a user device associated with the particular user. In another implementation, each output template of the multiple output templates indicates at least one activity suggestion and indicates one or more attributes of the at least one activity suggestion. In yet another implementation, the notification for output is provided to at least one user device associated with at least one user of a subset of users.

In another innovative aspect of the specification, an electronic system is described, including one or more processing devices; one or more machine-readable storage devices for storing instructions that are executable by the one or more processing devices to perform operations including, receiving (i) an indication that an event detection module has determined that a shared event of a particular type is presently occurring or has occurred, and (ii) data referencing an attribute associated with the shared event. The operations further include, selecting, by the electronic system, from among multiple output templates that are each associated with a different type of shared event, a particular output template associated with the particular type of shared event that the event detection module has determined is presently occurring or has occurred, and generating, by the electronic system, a notification for output using at least (i) the particular output template associated with the particular type of shared event determined to be presently occurring or determined to have already occurred, and (ii) the data referencing the attribute associated with the shared event. The operations still further include, providing, for output to a user device, the notification that is generated using at least (i) the particular output template, and (ii) the data referencing the attribute associated with the shared event of the particular type.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In yet another innovative aspect, a computer-implemented method is described, that includes, receiving an indication that an event detection module has determined that an event of a particular type is presently occurring or has occurred, and selecting, by a computing system, a particular output template associated with the particular type of event that the event detection module has determined is presently occurring or has occurred. The method includes, generating, by the computing system, a notification for output using at least the particular output template associated with the particular type of event determined to be presently occurring or determined to have already occurred, and providing, for output to a user device, the notification that is generated using at least the particular output template.

In one implementation, the method further includes, providing, by the computing system and to one or more user devices, at least one activity suggestion associated with the event, the at least one activity suggestion being based, in part, on at least one of: (i) the particular type of the event; or (ii) data referencing an attribute associated with the event. In one aspect of this implementation, selecting the particular output template associated with the particular type of event includes, using, by the computing system, one or more machine-learning algorithms based on analysis of the received data referencing the attribute associated with the event; and in response to using the one or more machine-learning algorithms, determining, by the computing system, the particular output template to be selected. In another aspect, at least one machine-learning algorithm receives data referencing a plurality of attributes associated with the event, the plurality of attributes being utilized, during execution of the at least one machine-learning algorithm, to train a template model used by the computing system to select the particular output template.

The subject matter described in this specification can be implemented in particular implementations and can result in one or more of the following advantages. The computing system of this specification removes the need to define explicit actionable suggestions embodied in output activity templates, but instead automatically analyzes data signals to detect the occurrence of a shared event and automatically selects actionable suggestions that are associated with the detected shared event. By not defining a multitude of explicit actionable suggestions, computing system processes are optimized and processing efficiency in an example computing environment is improved by minimizing unnecessary computations for activity or output template definitions. Shared events of a particular type that include at least two users are efficiently determined based on, for example, analysis of parameter signals corresponding to context data and event attributes. Data signal analysis of user devices which are not associated with a particular shared event is avoided thereby providing enhanced system bandwidth for other computations and system transmissions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is a flow diagram of an example process for actionable suggestions of one or more activities.

Like reference numbers and designations in the various drawings indicate like elements.

DETAILED DESCRIPTION

Processes are described that include automatically detecting that a particular event, such as a shared event, is taking place or took place. A shared event can include an event occurring in real-time in which at least two users in a group are presently associated with the occurring event. Additionally, a shared event can include an event that occurred at a past time-period and the at least two users were previously associated with the past event. Within this event context, this specification describes novel approaches for automatically detecting the occurrence of a shared event, shown in FIGS. 1-3. This specification further describes novel approaches for automatically providing actionable suggestions to at least one user associated with the detected shared event, shown in FIGS. 4-7.

Figure 1:
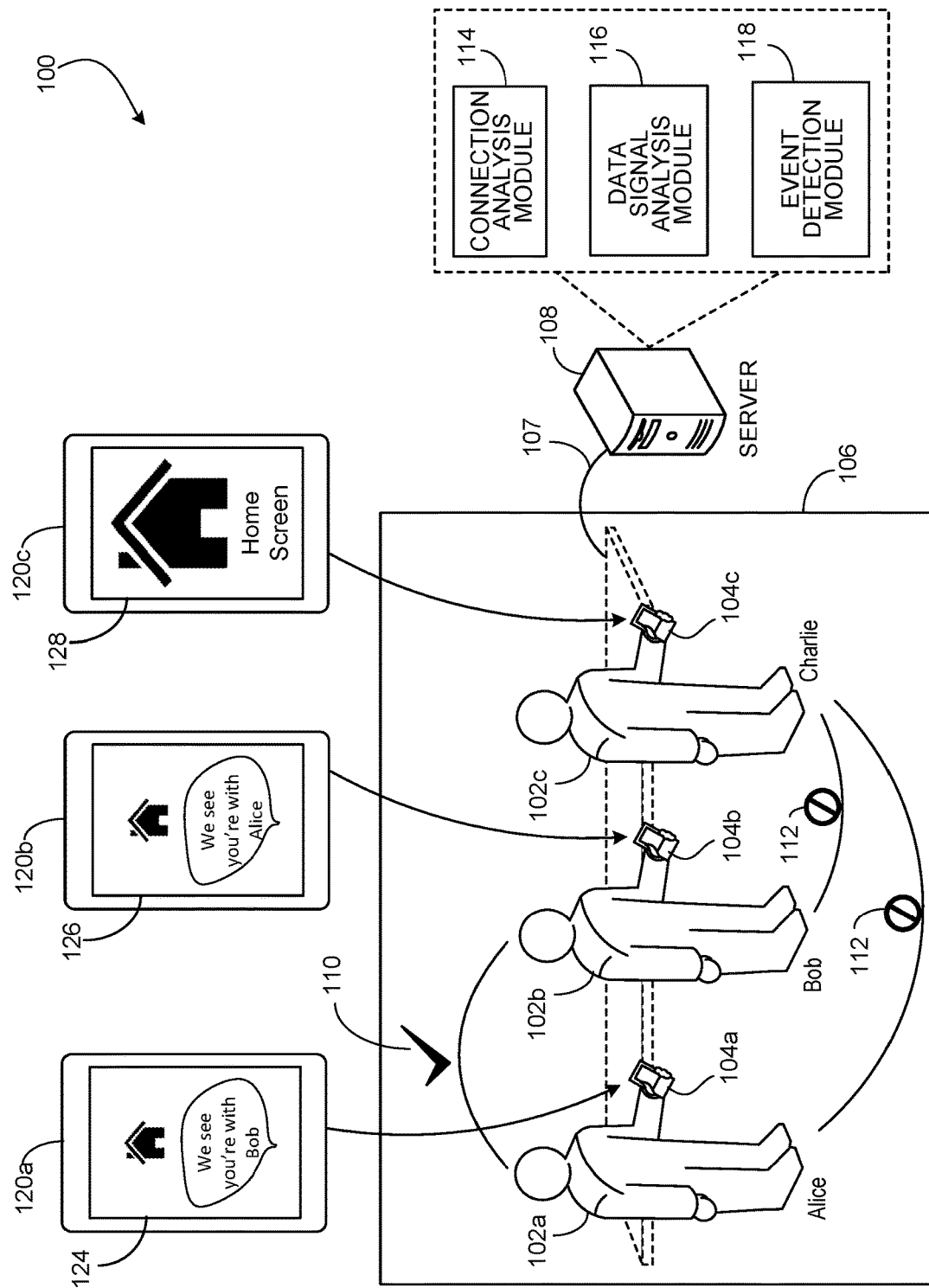
FIG. 1 is an example computing system for automatic detection of an event shared among at least two users of a user group.

FIG. 1 is an example computing system 100 for automatic detection of an event shared among at least two users of a user group. System 100 generally includes user devices 104*a/b/c* and corresponding users 102*a/b/c*. As shown, user device 104*a* is associated with, or owned by, user 102*a*—Alice, user device 104*b* is associated with, or owned by, user 102*b*—Bob, and user device 104*c* is associated with, or owned by, user 102*c*—Charlie. Example user devices 104*a/b/c* include smartphones, laptop/desktop computers, smart televisions, gaming consoles, tablet devices or other related computing device. As described herein, Alice, Bob and Charlie can form an example user group. In certain implementations, a subset of the example user group can include Alice and Bob, Alice and Charlie, or Bob and Charlie.

System 100 detects the occurrence of an event in which participation or association with the event is shared among a subset of users of a larger user group, users 102*a/b/c*. A computing device 104*a* of a first user 102*a* in the group provides data signals to server 108 that indicate, at least, a current context of the first user 102*a*, such as a physical, e.g., restaurant, or virtual environment, e.g., online meeting. System 100 can use the current context, and related data signal parameters, of the first user 102*a* to identify another user(s) 102*b* to form the subset of users 102*a/b*. A computing device 104*b* of the other user 102*b* in the subset can also provide data signals to server 108. System 100 can then compare parameter values of signal data provided by the first user 102*a* with parameter values of signal data provided by the other user 102*b*.

For example, system 100 can receive sets of parameter signals from the devices 104a/b of the respective users in the subset, i.e., first user 102a and the other user 102b. The parameter signals can include location data and temporal data for the respective users 102a/b. System 100 can compare location and temporal data for the first user 102a with location and temporal data for the other user 102b. If the comparison shows that parameter values provided by devices 104a/b of each user 102a/b in the subset either overlap or substantially match, then system 100 can determine that users 102a/b in the subset are participating in, or associated with, the same event. System can then indicate to the users 102a/b of the subset that a shared event is occurring or has occurred.

In general, server 108 executes a variety of functions associated with signals/parameter analysis, including probability determinations for reliable and accurate detection of the occurrence of a shared event between at least two users 102. In response to detecting the occurrence of a shared event, system 100 indicates to at least one of user 102a/b/c that a subset of the users of a larger user group are all associated with a shared event.

For example, regarding user 102a—Alice, system 100 can provide a text display on user device 104a to indicate, to Alice, that Alice and user 102b—Bob are both involved in a shared event or common activity. As shown, UI 124 of Alice's user device 104a can include a short message service (SMS) based notification that indicates system 100 has detected or determined that Alice is with Bob, i.e., that users 102a and 102b are participating in a shared event. Likewise, UI 126 of Bob's user device 104b can also include a SMS notification that indicates system 100 has detected or determined that Bob is with Alice, i.e., that users 102b and 102a are participating in a shared event.

In addition to or in lieu of the SMS text display notification viewable on Alice's device, in some implementations, user device 104a/b/c can be configured to include text-to-speech output functionality. In these implementations, the text-to-speech function of user device 104a/b/c can be activated to cause the device to speak or output audio in a natural manner as it relates to human speech. For example, the audio output can correspond to the contents of the SMS text notification of UI 124. In some instances, the text-to-speech function can be activated manually by user 102a/b/c. In other instances, the text-to-speech function can be activated automatically by a processor of the device in response to system 100 detecting the occurrence of a shared event.

As shown, connection 110 can be a confirmatory indication that Alice and Bob are both participating in a shared event. In contrast, no connection 112 can be a confirmatory indication that user 102c—Charlie is not associated with, or participating in, the shared event that includes Alice and Bob. Accordingly, UI 128 of Charlie's user device 104c will not include an SMS or other related notification because system 100 has not detected or determined that Charlie is with Alice or Bob, or that user 102c is participating in a certain shared event.

In some alternative implementations, connection 110 can indicate that Alice and Bob share a connection that predates the occurrence of the shared event. In contrast, no connection 112 can indicate that, although Alice, Bob, Charlie are each a part of a larger user group, no connection exists between Alice and Charlie or between Bob and Charlie that predates the occurrence of the shared event. As described in more detail below, a connection 110 that predates the occurrence of a shared event can be a precursory factor used by server 108 and system 100 to, in part, detect that a subset of users are involved in a shared event.

As described in more detail below, processes carried out by system 100 can be associated with events or activities that occur in connection with environment 106. In some implementations, environment 106 can be a virtual environment 106, a physical environment 106, or a mixed environment 106 that includes attributes of both virtual and physical settings. Example mixed environments 106 can include two conference rooms that are connected via a virtual meeting with several people in each conference room, or in a gaming scenario, multiple groups playing in different locations, such as in an ingress game(s).

Example virtual environments 106, and example corresponding events, can include computing sessions associated with virtual meetings, online gaming sessions, audio and/or video teleconferencing, digital broadcasts sessions, e.g., television shows/content streaming events, etc., or any other virtual based or electronic computing session shared between at least two users 102 of a larger user group.

Example physical environments 106 can include venues or locations such as restaurants, movie theaters, sporting arenas, fitness locations, or any other physical venue or location suitable for hosting an event shared between at least two users 102 of a larger user group. Example shared events or shared activities can include at least two users 102 dining at the same restaurant, attending or viewing the same movie showing, attending the same sporting event, e.g., football game or basketball game, etc, running the same race event, e.g., 5K or half marathon, etc., or any other activity/event shared between at least two users 102 of a subset of a larger user group.

As shown in FIG. 1, an example user group can include only three users 102a, 102b and 103c. However, in alternative implementations, an example user group can include multiple users on the order of tens, hundreds or even thousands of users. Likewise, a subset of the larger user group can also include multiple users and will generally include at least two users 102. As indicated above, each user device 104a/b/c includes a corresponding display 120a/b/c. Display 120a can include an example user interface (UI) 124, display 120b can include an example user interface (UI) 126, and display 102c can include an example user interface (UI) 128.

System 100 includes a computing device/server 108 that receives data signals 107, e.g., non-transitory propagating signals, from at least one or more user devices 102a/b/c. As shown, server 108 can include a connection analysis module 114, a data signal analysis module 116, and an event detection module 118. In some implementations, server 108 can include additional or fewer modules and system 100 can include one or more additional servers or computing devices. Modules 114, 116, and 118 are generally representative of connection analysis and data signal processing functions that can be executed by server 108. Modules 114, 116, 118 are described in more detail below with reference to FIG. 2.

As used in this specification, the term "module" is intended to include, but is not limited to, one or more computers configured to execute one or more software programs that include program code that causes a processing unit(s) of the computer to execute one or more functions. The term "computer" is intended to include any data processing device, such as a desktop computer, a laptop computer, a mainframe computer, a personal digital assistant, a server, a handheld device, or any other device able to process data.

Figure 2:
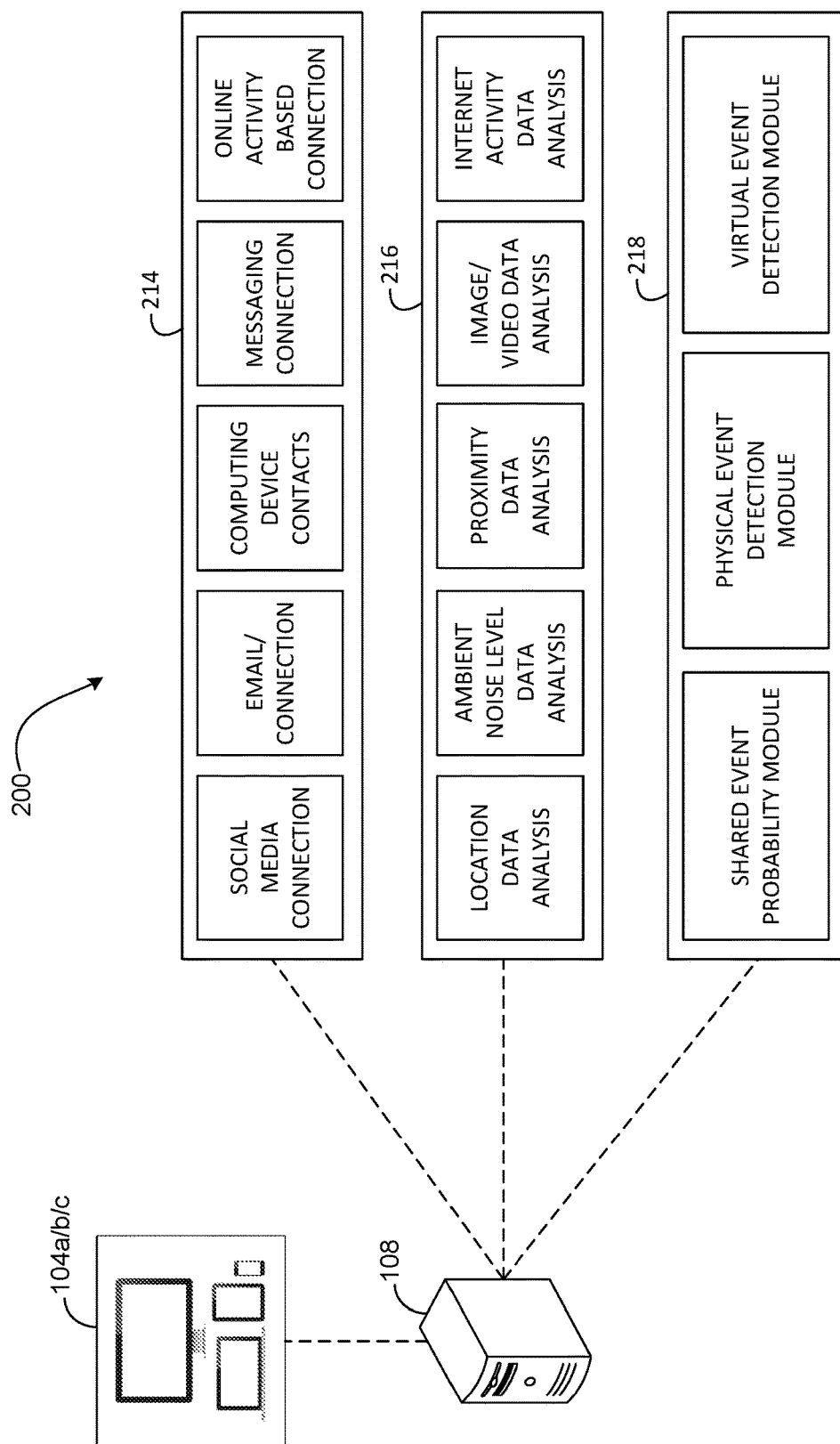
FIG. 2 illustrates a diagram including modules associated with an example computing device of the computing system of FIG. 1.

FIG. 2 illustrates a diagram including module-grouping 200 associated with an example computing device of the computing system of FIG. 1. In some implementations, module-grouping 200 is associated with server 108 of system 100 and, for example, can be disposed within server 108 or can include independent computing devices that collectively are coupled to and in data communication with server 108. Module grouping 200 generally includes modules 214, 216, and 218. In some implementations, module 214 can correspond to the connection analysis module of system 100, module 216 can correspond to the data signal analysis module of system 100, and module 218 can correspond to the event detection module of system 100.

Figure 3:
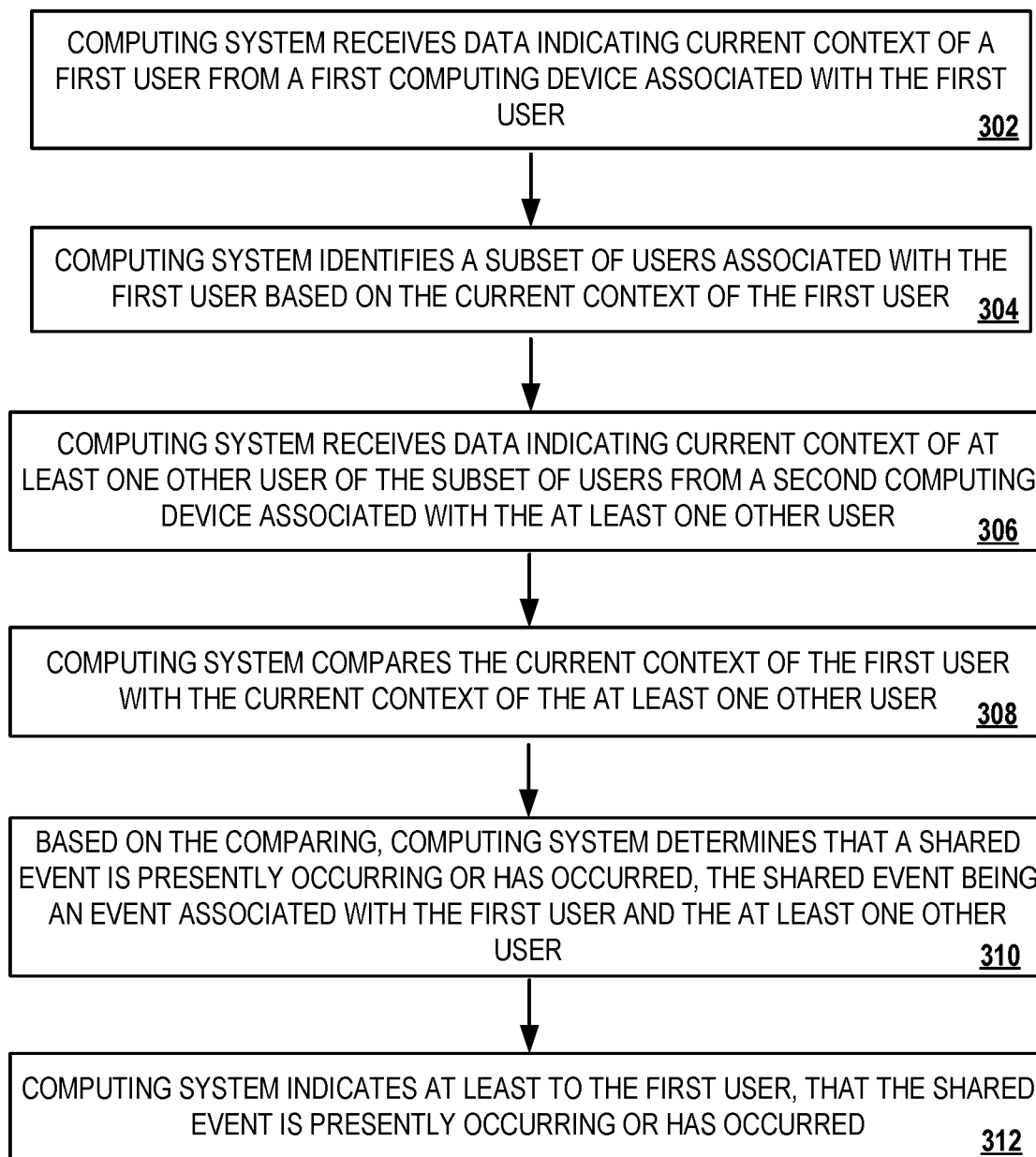
FIG. 3 is a flow diagram of an example process for automatic detection of an event shared among at least two users of a user group.

The description of the implementations of FIG. 2 and FIG. 3 will reference the above described features of FIG. 1. As discussed above, system 100 can determine that users within a subset of a larger user group are connected to each other, and thus, may share a connection that predates the occurrence of a particular shared event. As described in this specification, a "connection" will correspond primarily to a virtual or electronic based connection that is detected or determined to exist based on analysis, by system 100, of data signals associated with user devices 104a/b/c.

In general, system 100 can be implemented, in part, by execution of program code in the form of an executable application, otherwise known as an "app," that can be launched or executed from user device 104a/b/c. Upon execution of the application program code, the app can then establish a data connection with server 108 to transmit data signals to server 108 as well as receives data signals from server 108. In some implementations, once launched from an example user device 104a/b/c, system 100 can be granted certain permissions by users 102a/b/c. The permissions can cause system 100 to, for example, have access to data associated with one or more other application programs or apps stored within a memory unit of user devices 104a/b/c.

In general, system 100 can be granted permissions to access data associated with example applications such as, social media applications, email applications, messaging applications, contacts applications, global positioning system (GPS) applications, proximity connection applications, e.g., Bluetooth Low Energy (BLE), Near Field Communications (NFC), digital image acquisition or camera applications, virtual meeting/conferencing applications, and online gaming applications.

System 100 can also be granted permissions to access data associated with one or more sensor based applications that include functionality associated with accelerometers, gyroscopes, compasses, or any other sensory application. In some implementations, system 100 can be given permission, by users 102a/b/c, to access data associated with all applications or executable program code stored within corresponding user devices 104a/b/c.

Module 214 can be configured to access data associated with the application programs of user device 104a/b/c to detect or determine if one or more connections exist among users within a large user group. In some implementations, Alice and Bob can share, for example, a connection through one or more social media applications. In one aspect, Alice and Bob can be connected, e.g., are "friends," through an example social media or networking application such as Google+™. A variety of other social media applications can be used as a basis for system 100 to determine or detect that a connection exists between users of a subset.

In general, detection of a shared connection by system 100 can indicate, for example, that users of a subset have at least corresponded with each other prior to occurrence of the shared event. In some instances, users 102a/b—Alice and Bob may be stored as contacts in each other's user device 104 or may be associated with the same social group of a particular social network or social media application. In some implementations, module 214 can scan data communications associated with email or messaging accounts, e.g., Gmail™ and Google Chat™, managed by users 102a/b/c to detect or determine that a connection exists among users within the larger user group.

In other implementations, module 214 can scan data associated with online activities associated with users 102a/b/c such as, for example, data exchanged between users during online gaming sessions, hash-tagging or re-tweeting data communications of certain users, or "liking" certain content posted or uploaded by users within the larger user group. In some instances, module 214 can scan data associated with online activities that occur within a predefined timespan. For example, online activities may include groups that are formed on an ad-hoc basis and, thus, users in the groups may not have easily detectable connections that predate the occurrence of the shared event. Hence, certain time-spans can be predefined so that a shared event can be detected for an example scenario in which ad-hoc groups of users share participation in a particular event, such as, an augmented reality game. In other instances, after determining that a shared connection exists among users 102a/b/c within the larger user group, server 108 can use the shared connection data to identify, from a set of users 102a/b/c, a subset of users, e.g., Alice and Bob.

In some implementations, system 100 receives, by way of module 216, data signals that indicate a current context of users 102a/b/c. For example, the current context of users 102a/b/c can be a physical environment or a virtual environment. In alternative implementations, after determining that a shared connection exists among certain users 102a/b/c and/or after receiving a current context of certain users 102a/b/c, server 108 can use the connection data and the current context data to also identify, from a set of users 102a/b/c, a subset of users.

For a given subset of users, i.e., Alice and Bob, module 216 can be configured to access and analyze data signals associated with certain application programs of user device 104a and user device 104b. Responsive to the user connection analysis described above and the data signal analysis, system 100 can detect or determine that a shared event, among Alice and Bob, is either occurring in real-time or has occurred during a past time period. In some implementations, system 100 can use several available signals transmitted by user device 104a/b to determine whether Alice and Bob are taking part or took part in a shared event.

For example, module 216 can receive and analyze a variety of different data signals transmitted by user device 104a/b during execution of certain application programs stored on the user devices. In some implementations, user device 104a and user device 104b each transmit one or more sets of data signals that are received by module 216 of server 108. For example, module 216 can receive data signals from respective user device 104a/b corresponding to at least one of location/GPS data, ambient noise level data, proximity/BLE/NFC data, digital image data such as pictures, video, etc., or internet activity data such as streaming content. Module 216 can also receive data signals corresponding to one or more sensor based applications on user device 104a/b that include device accelerometer data, device gyroscope data, device compass data, or any other data signals associated with other movement based sensory applications of user device 104a/b.

As indicated above, system 100 can receive data signals that indicate a current context, e.g., physical or virtual environment, of users 102*a/b/c*. In some implementations, the data signals described in the preceding paragraph are compared between at least two users of a subset of user. The data signals may indicate a current context of the at least two users as well as information indicating certain attributes of the current context. For example, the data signals can indicate that a current context of the at least two users is a physical environment such as a restaurant. Further, certain attributes of the current context can indicate the relative location of the restaurant or other venue location as well as temporal characteristics of a current context, e.g., data and time.

System 100, can compare the current context of the users within the subset, e.g., Alice and Bob. In general, a comparison of the current context can include a comparison of parameter values associated with data signals of each user device 104*a/b* within the subset of users. In some implementations, comparing parameter values associated with data signals of each user device 104*a/b* includes system 100 receiving a first set of data signals from user device 104*a* and a second set of data signals from user device 104*b*. Additionally, comparing the parameter values can further include detecting an overlap in a value associated with the first set of data signals and a value associated with the second set of data signals.

In some implementations, the overlap or substantial match in parameter values indicates a probability of an occurrence of the shared event. For example, if the comparison shows that parameter values provided by user devices 104*a/b* of each user 102*a/b* in the subset either overlap in value or have values that substantially match, then system 100 can determine that users in the subset are participating in, or associated with, the same event. In some instances, a first parameter value can substantially match a second parameter value if one value is within a predefined threshold of the other value. Example thresholds for detecting whether a first parameter value substantially matches a second parameter value can include, one value being within 25%, 50%, or 75% of the other value. The preceding thresholds are examples, and a variety of threshold values can be implemented depending, for example, on the types of parameters that are being compared.

Regarding comparisons of data signals indicating GPS, proximity or location data, system 100 can, for example, compare latitude and longitude positional data for each of user 102*a/b*. In some implementations, system 100 detects or determines the occurrence of a shared event among users 102*a/b* in response to determining that Alice is within a threshold proximity to Bob or that Bob is within a threshold proximity of Alice. For example, parameter values for location data, e.g., latitude and longitude, transmitted by user device 104*a*—Alice can be compared with parameter values for location data transmitted by user device 104*b*—Bob.

In one instance, the relative parameters are compared to determine if there is an overlap or a substantial match between the respective values. In another instance, the respective locations of user 102*a* and 102*b* are compared to determine if, for example, Alice is within one foot, five feet, or 10 feet of Bob. In some implementations, the threshold proximity/location for detection of the occurrence of a shared event is that Alice is at least within one foot of Bob or that Bob is at least within one foot of Alice.

The following are example shared events that can be detected by system 100 based on certain analysis functions performed by system 100: 1) a group of friends/users having dinner together and system 100 analyzes location, GPS, or proximity data signals transmitted by each user device to detect that a first user is within a threshold proximity of other users in a subset; 2) in a shared event, one of the participants/user is looking up information on the internet and system 100 detects that a particular web search is being performed while a first user is within a threshold proximity of another user in the subset of users; 3) a group of users within the subset are going to the cinema jointly and system 100 detects that one of the attendants/user searched for movie show times of a particular movie being shown at a theater that is within a threshold proximity of another user in the subset of users; 4) a group of users within a subset are attending a party and system 100 analyzes calendar events, or email/messaging communications stored in each user device to detect that a first user is attending the same party/social event as other users in the subset; 5) a group of users are in the same general area and digital images, videos, or photos captured by a user device of a user in the subset are geo-tagged and scanned by system 100 to detect that other users within the subset are either viewable within the captured digital image/video or are within a threshold proximity of the location in which the images/videos were captured.

Additional example shared events and corresponding analysis functions of system 100 can include: 6) an online gaming session, e.g., type of game, time/date game is played, console used to play the game, etc., in which data transmissions associated with the session are received and analyzed by system 100 to detect that users within a subset are associated with the same computer game or gaming session; 7) a video conference or virtual meeting and system 100 scans/analyzes the meeting invite list or other data attributes associated with the virtual meeting to detect or determine that at least two users of the subset or each associated with the same online meeting/video conference; 8) noise levels occurring a particular entertainment venue and system 100 analyzes data signals associated with ambient noise levels transmitted by user devices to detect that a first user is in a noise environment, e.g., at a concert, that is within a threshold decibel level of other users in the subset; 9) a group of users are in the same general area and system 100 receives and analyzes movement sensor data signals— e.g., abrupt/erratic acceleration data indicative of a roller coaster ride at an amusement park—transmitted by a user device of a user in the group and detects that that the user shares movement sensor data that overlaps with, or substantially matches, movement data associated with other users in the subset; 10) a group of users at a shared sports activity such as a running event and system 100 analyzes location, GPS, or proximity data signals as well as sports app data signals transmitted by each user device to detect that a first user is participating in the same sports activity as other users in the subset.

Module 218 can be configured to access data associated with the application programs of user device 104*a/b/c* to detect or determine whether the shared event is associated with a physical environment or a virtual environment. Additionally, module 218 can include at least one probability module that utilizes program code, such as machine learning algorithms, and that receives and analyzes multiple data signals associated with the application programs of user device 104*a/b/c*. The probability module can be used to develop predictive models that detect or determine the occurrence of a shared event within a certain degree of accuracy. In some implementations, based on outcomes calculated by the predictive models, a probability metric can be generated that indicates the probability that a shared event is taking place or has taken place between a subset of users. System 100 can also be programmed or trained to indicate the occurrence of a shared event in response to the probability metric exceeding a threshold probability metric.

In some implementations, system 100 can receive, analyze, and correlate the data signals across users that share a connection. In general, the above-mentioned probability metric can correspond to a likelihood of the occurrence of a shared event. Hence, the likelihood that a shared event is taking place or took place can increase based on the determined probability metric exceeding a threshold probability metric. In some implementations, system 100 can determine the likelihood, i.e., generating the probability metric, in a variety of ways, including application of machine learning principles. For example, certain machine learning principles, such as integration of neural networks or logistic regression, can be applied to standard correlation measures. More particularly, a shared event probability module of system 100 can include a set of adjusted thresholds, or a cascade of programmed triggers.

As discussed above, a variety of data signals can be transmitted to system 100 from user device 104a/b/c. Hence, in some implementations, the thresholds or programmed triggers can initiate in response to system 100 detecting certain similarity factors associated with data signal parameter values that are evaluated or compared by server 108 or module 216. Machine learning based probability modules of system 100 can then be adjusted or trained based on a set of collected positive and negative use case models. For example, positive use case modules can include one or more actual detected shared events based on overlapping/matching parameter values and confirmation from user 102a/b indicating that Alice is indeed with Bob or that Bob is indeed with Alice. Negative use case models can include one or more false positive or incorrect shared event detections based on marginally overlapping/matching parameter values and/or no confirmation from user 102a/b indicating that Alice is with Bob or that Bob is with Alice.

FIG. 3 is a flow diagram of an example process 300 for automatic detection of an event shared among at least two users of a user group. At block 302 of process 300, system 100 receives data indicating a current context of a first user 102a—Alice. In some implementations, the current context can indicate that Alice is at Morton's Steakhouse on a Friday night around 8pm eastern standard time (EST). The data signals can be received from/provided by a first computing device 104a that is associated with Alice. For example, Alice, while waiting at Morton's, can launch, from her mobile device 104a, an example application program, "Event app," associated with processes executed by system 100. Alice can then grant Event app permission to access, at least, a location app and a contacts app on her mobile device and transmit Alice's location data and contacts to server 108.

At block 304, system 100 identifies, based on the current context of first user 102a, a subset of users 102a/b—Alice and Bob from a set of users 102a/b/c—Alice, Bob, and Charlie associated with the first user 102a. For example, Bob may also have Event app loaded on his mobile device 104b and may also have granted permissions to Event app to access Bob's location app, contacts app, or social media account. In this example, system 100 scans Alice's contact list and locates contact information associated with Bob. Likewise, system 100 scans Bob's contact list and locates contact information associated with Alice. System 100 can then determine that Alice and Bob share a connection based on the corresponding located contact information. In response to detecting that a shared connection exists between Alice and Bob, system 100 then forms a subset of users that includes Alice and Bob.

At block 306, system 100 receives, from a second computing device 104b associated with at least one other user, namely Bob, of the subset of users 102a/b, data indicating a current context of the at least one other user. For example, as discussed above, the current context can indicate that Bob is also at Morton's Steakhouse on a Friday night around 8pm EST Likewise, Bob, while also waiting at Morton's, can launch, from his mobile device 104b, Event app and transmit his location data to server 108.

At block 308, system 100 compares the current context of the first user 102a—Alice with the current context of the at least one other user 102b—Bob. For example, system 100 can compare data signals associated with GPS/location data transmitted to server 108 from Alice's mobile device with data signals associated with GPS/location data transmitted to server 108 from Bob's mobile device.

At block 310, based on the comparing step at block 308, system 100 determines that a shared event is presently occurring or has occurred. System 100 detects or determines the occurrence of a shared event among users 102a/b in response to determining that Alice is within a threshold proximity of Bob or that Bob is within a threshold proximity of Alice. The threshold proximity for detection of a shared event can be that Alice, while at Morton's, is at least within 10 feet of Bob or that Bob, while at Morton's, is at least within 10 feet of Alice. In certain implementations, shared events can be physical events in which Alice and Bob are co-located, or virtual events in which a group of users participate jointly in an example online activity such as a video conference or an online gaming session.

At block 312, system 100 indicates at least to the first user 102a, that the shared event is presently occurring or has occurred. For example, system 100 can cause the Event app to display a notification, e.g., shown via UI 124, to Alice or to Bob, e.g., shown via UI 126, or to both Alice and Bob. The notification can include a sample text statement indicating that system 100 has detected that Alice is with Bob or that Bob is with Alice. In some implementations, the notification can also include information indicating the type of shared event/activity, "dinner @ Morton's Steakhouse," and temporal data associated with the shared event. The temporal data can include a date and current time or a date and a time span of the shared event. Example time spans include: 1) from this evening until now; 2) since 1 hour ago; 3) until now, 4) still on-going; 5) or since 8 pm until 10 minutes ago.

As noted above, FIGS. 1-3 have illustrated novel approaches for automatically detecting the occurrence of a shared event. The remaining FIGS. 4-7 describe novel approaches for automatically providing actionable suggestions to at least one user associated with the detected shared event. As will be discussed in more detail below, in response to automatically detecting the occurrence of a shared event, a system and processes are described for suggesting one or more activities that are related to the shared event. Suggesting the activities can include, for example, the system determining the type of shared event and an attribute of the shared event using data signals provided by a user device. Accordingly, actionable suggestions for activities associated with the shared event can be provided to the users based, in part, on the type of event and an attribute of the event.

Figure 4:
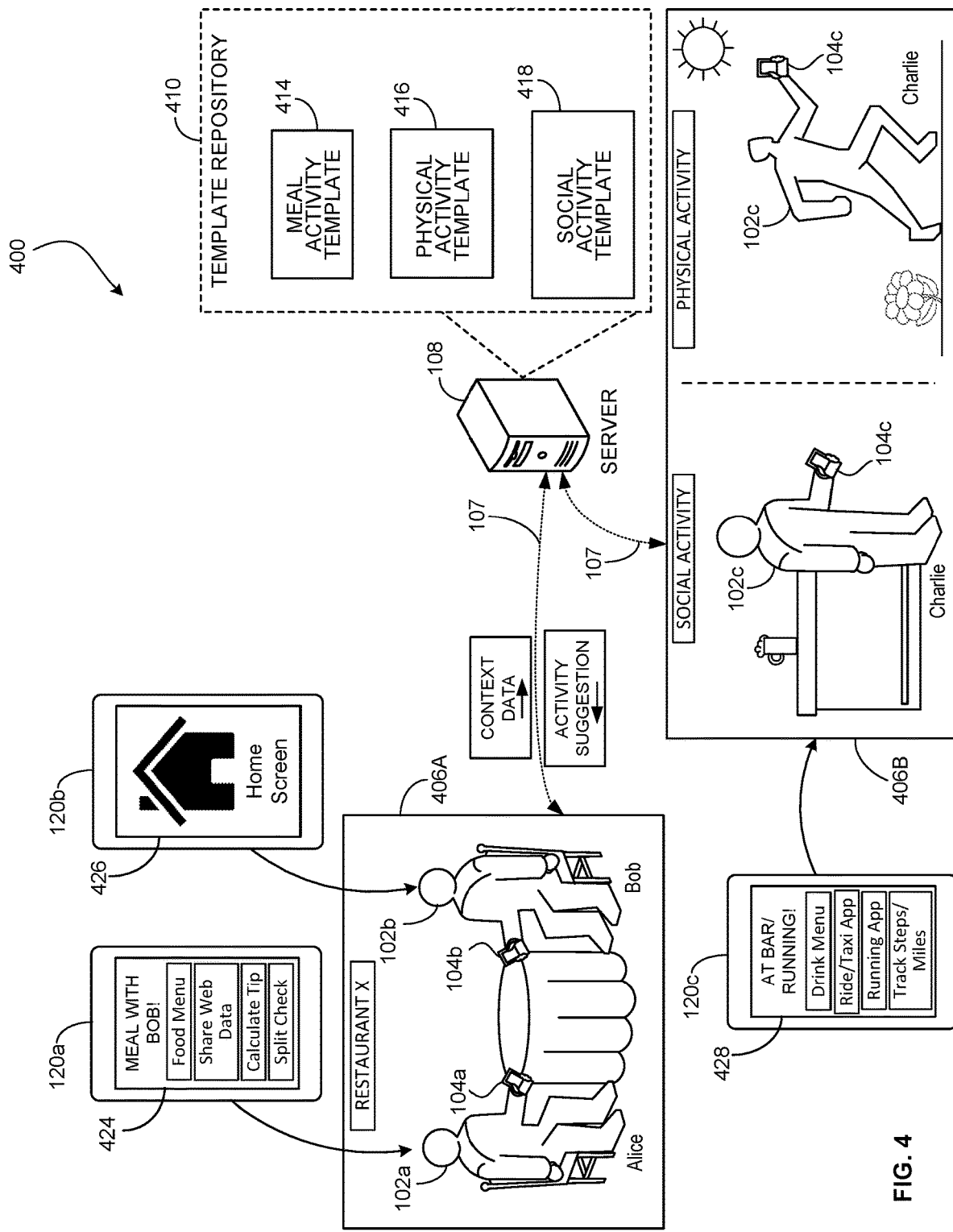
FIG. 4 is an example computing system for actionable suggestions of one or more activities.

FIG. 4 is an example computing system 400 that provides actionable suggestions of one or more activities. The implementation of FIG. 4 can include one or more features having corresponding reference numbers that are also depicted in the implementation of FIGS. 1 and 2. More particularly, in addition to the functionality described below, in some implementations, system 400 can be also configured to execute all functionality described above with reference to the implementations of FIGS. 1-3. Accordingly, descriptions for certain features discussed above for system 100 can be referenced for equivalent features also depicted in system 400.

System 400 generally includes user devices 104a/b/c and corresponding users 102a/b/c. System 400 further includes server 108 that receives multiple data signals 107 from each of user devices 104a/b/c. As shown, server 108 can include a template repository 410 that includes a meal activity template 414, a physical activity template 416, and a social activity template 418. In some implementations, template repository 410 can reside in a storage medium of an example computing module associated with server 108. Server 108 can include multiple modules and system 400 can include one or more additional servers or computing devices. Templates 414, 416, and 418 are generally representative of a variety of activities that can be suggested by server 108 in response to the server determining that a shared event of a particular type is either presently occurring or has occurred in the past. Template repository 410 and templates 414, 416, and 418 are related to features which are described in more detail below with reference to FIG. 5 and FIG. 6.

In general, system 400 can detect the occurrence of an event. In some implementations, the event can be a shared event in which participation in or association with the event can be shared among a subset of users of a larger user group including each of users 102a/b/c. User device 104a can provide data signals to server 108 that indicate context data of user 102a. The context data can be a parameter value that references an event context and/or an attribute of the event in which user 102a is participating. For example, the context data can indicate that user 102a is associated with a shared event in a physical environment, such as a restaurant or bar/pub, or a virtual environment, such as an online meeting.

In some implementations, detected events or detected shared events can be manually or explicitly entered by user 102a/b/c as user input to user device 104a/b/c. For example, user 102a can create a calendar invite or event notification that includes user 102b as an attendee. Thus, when the event corresponding to the calendar invite occurs, system 400 can receive data signals 107 indicating the occurrence of an event or shared event of a particular type. In other examples, user 102a/b/c can receive a UI notification, via user device 104a, associated with an application program relating to a virtual/online meeting. User 102a can provide confirmation, via user input, that indicates attendance or participation in the virtual/online meeting. In response to providing the user input, system 400 can receive data signals 107 indicating that user 102a is associated with an event or shared event of a particular type, e.g., virtual/online activity type, that is either presently occurring or that occurred at a past time period.

In some implementations, system 400 can receive sets of parameter signals from devices 104a/b of the respective users in a subset, i.e., user 102a and another user 102b. The parameter signals can be used to detect or determine: 1) whether at least one of users 102a/b is associated with an event of a particular type; or 2) whether user 102a and user 102b are each associated with the same shared event of a particular type. In general, server 108 executes a variety of functions associated with signals/parameter analysis, including probability determinations for reliable and accurate activity suggestions in response to detecting the occurrence of a shared event of a particular type. Hence, in response to detecting the occurrence of the shared event, system 400 provides, to at least one user 102a/b/c, actionable suggestions corresponding to activities associated with the particular type of the determined event.

In an example implementation, system 400 can provide a text display on user device 104a to indicate, to Alice, that Alice and Bob are both involved in a shared event or common activity. Moreover, the text display can include one or more output templates that include suggested activities that can be performed by Alice relative the detected event type. As shown, UI 424 of Alice's user device 104a can include a notification that indicates system 400 has detected or determined that Alice is having a meal with Bob. UI 424 further includes at least one template that includes multiple suggested activities associated with an example event such as eating a meal at a restaurant. As shown, the suggested activities associated with eating a meal at a restaurant can include launching a tip calculator application from user device 104a or using a related application to split the payment amount of the restaurant bill/check.

In the implementation depicted in FIG. 4, UI 426 of Bob's user device 104b shows a "home screen" because system 400 has not received context data, from user device 104b, that indicates Bob's participation in an event of a particular type. However, in alternative implementations, Bob's user device 104b can provide multiple data signals, to server 108, that include context data relating to a particular event in which Bob is participating or has participated in at a past time period. As such, in some implementations, UI 426 can also include one or more templates including suggested activities that can be performed by Bob relative to the detected event type.

In some implementations, system 400 can provide a text display on user device 104c to indicate, to Charlie, that the system has detected or determined that Charlie is participating in an event of a particular type. Moreover, the text display can include one or more output templates that include suggested activities that can be performed by Charlie relative to the detected event type. As shown, UI 428 of Charlie's user device 104c can include a notification that indicates system 400 has determined that Charlie is engaging in an example social activity such as consuming a beer/drink at a local bar/tavern, or that Charlie is engaging in an example physical activity such as going for a run in a local park. UI 428 further includes at least one output template that includes multiple suggested activities associated with the example social and physical events in which Charlie is engaged in.

In general, processes carried out by system 400 can be associated with events or activities that occur in connection with environment 406. In the implementation of FIG. 4, environment 406A can be a physical environment such as a restaurant or related dining establishment. Similarly, environment 406B can be an alternate physical environment such as a local pub/tavern, a certain outdoor area, or a certain indoor fitness venue in which one or more individuals engage in various physical activities. In some implementations, environments 406a/b can include a variety of different environment types relating to any virtual environment 406, any physical environment 406, or any mixed environment 406 including attributes of both virtual and physical settings.

Figure 5:
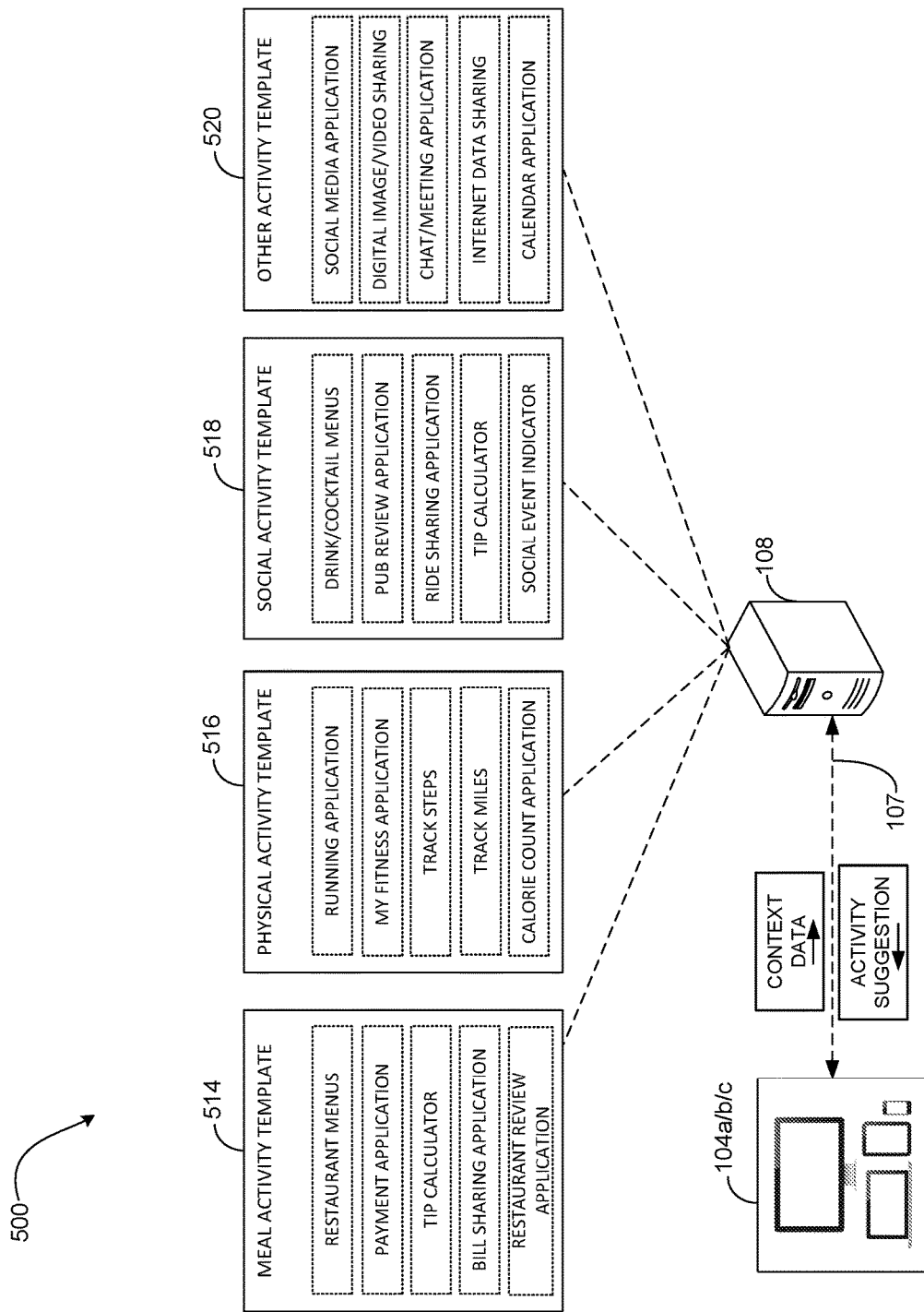
FIG. 5 illustrates example activity templates that include multiple suggestions of one or more activities.

FIG. 5 illustrates example output activity templates 500 that are associated with server 108 of system 400. In general, output activity templates 500 can include multiple output templates having multiple activities that can be selected for output by system 400 as activity suggestions to users 102a/ b/c. As shown, activity templates 500 can include an example meal activity template 514, an example physical activity template 516, and an example social activity template 518. Example templates 514, 516, and 518 can each directly correspond to the activity templates depicted in the implementation of FIG. 4.

As discussed above, system 400 is configured to provide activity suggestions to one or more users 102*a/b/c* in response to detecting that the one or more users are participating in, or are associated with, an event of a particular type or a shared event of a particular type. As discussed in more detail with reference to FIG. 6, system 400 can provide one or more activity suggestions by, for example, analyzing data signals received from user devices 104*a/b/c*. Analyzing the data signals allows system 400 to determine an attribute associated with an example shared event in which a subset of users are jointly participating.

In particular, parameter values of the data signals can indicate that the users are associated with a particular type of shared event. Accordingly, based, at least in part, on the type of the detected shared event and/or at least one attribute associated with the detected shared event, a particular output template can be selected by system 400 from among multiple output activity templates 500. The selected output template can then be provided to the one or more users 102*a/b/c* that are associated with the detected shared event.

As shown in FIG. 5, server 108 can be used by system 400 to select a particular output activity template from a variety of example output activity templates 500. In some implementations, activity templates 514, 516, 518, and 520 can reside in a storage medium of an example computing module associated with server 108. In general, a single output template or multiple output templates can be selected to be provided to the one or more users 102*a/b/c* associated with the detected shared event. The selected output template(s) can include multiple actionable suggestions for a variety of activities associated with the detected shared event. In some implementations, at least one activity suggestion that is included in at least one output template can be a suggestion that a user shares certain digital or electronic content with one or more members/users within a subset of users or at least one user that is not within the subset of users.

In general, system 400 can receive context data via data signals 107. The context data can indicate that one or more users 102*a/b/c* are associated with an event relating to a meal activity event type, a physical activity event type, a social activity event type and/or another event type that may or may not have an association with the aforementioned event types. In some implementations, the context data can include data referencing an attribute of the shared event. For example, context data received by server 108 can include parameter signals, e.g., location data or data relating to a social media status update, indicating that users 102*a/b* are each sharing a meal at a restaurant. More particularly, the attribute data associated with the shared dining event can indicate that users 102*a/b* are each located at Restaurant X. Accordingly, system 400 can be configured to select meal activity template 514 and generate a notification for output that is provided to at least user 102*a*.

The notification can include multiple suggested actions or activities that correspond to the detected shared event, i.e., a meal activity event type. For example, at least one suggested action can include providing a link to, or otherwise enabling, user 102*a* to access an electronic representation of menus available at Restaurant X. Additional suggested actions can include enabling user 102*a* to: launch a payment application for paying the restaurant bill/check; launch a tip calculator application; launch a bill sharing application to perhaps split the bill/check with another user participating in the meal event; launch an example social media application to tag users that participated in the meal event; or launch an example restaurant review application, such as, e.g., Yelp®, TripAdvisor®, or restaurant reviews accessible via search engines such as Google search.

In another example, context data received by server 108 can include parameter signals, e.g., accelerometer and/or gyroscope data, indicating that at least one user 102*a/b/c* is participating or engaged in a physical activity event of a particular type. More specifically, attribute data, e.g., a GPS parameter signal, associated with the physical activity event can indicate that user 102*c* is running in the park or exercising at Gym X. Accordingly, system 400 can be configured to select physical activity template 516 and generate a notification for output that is provided to at least user 102*c*.

The notification can include multiple suggested actions or activities that correspond to the detected event, i.e., a physical activity event type. For example, at least one suggested action can include providing a link to, or otherwise enabling, user 102*c* to access program code that tracks, records, and/or incrementally saves the number of steps that user 102*c* takes while walking/running during a given time period. Additional suggested actions can include enabling user 102*c* to: launch a fitness application for tracking fitness metrics or goals; launch a running application for monitoring running metrics/goals or for tagging other users involved in a certain running event; or launch a calorie count application for tracking and/or monitoring caloric intake during a given time period.

In another example, context data received by server 108 can include parameter signals, e.g., location data, calendar event data, or ambient noise data, indicating that at least one user 102*a/b/c* is participating or engaged in a social/entertainment activity event of a particular type. More specifically, attribute data, e.g., a GPS parameter signal, associated with the social activity event can indicate that user 102*c* is having a beer or enjoying cocktails at a local bar/lounge or dancing at a certain party or concert venue. Accordingly, system 400 can be configured to select social activity template 518 and generate a notification for output that is provided to at least user 102*c*.

The notification can include multiple suggested actions or activities that correspond to the detected event, i.e., a social activity event type. For example, at least one suggested action can include providing a link to, or otherwise enabling, user 102*c* to access an electronic representation of cocktail/drink menus available at the local bar/pub. Additional suggested actions can include enabling user 102*c* to: launch an example ride sharing application such as Uber® or Lyft®; launch a tip calculator application; or launch an example bar/pub review application, such as, e.g., Yelp®, TripAdvisor®, or pub reviews accessible via search engines such as Google search. In some implementations, a suggested action can include enabling user 102*c* to launch an example social event indicator application that is configured to propose one or more additional bar or lounge venues that user 102*c* can visit at a later time period.

In yet another example, context data received by server 108 can include parameter signals, e.g., image/video data, online activity data, or virtual meeting data, indicating that one or more users 102*a/b/c* are participating or engaged in an activity event or shared event of a particular type. More specifically, attribute data associated with the shared event can indicate that, for example, users 102*a/b/c* are each conversing at the same local coffee shop or are each participating in the same virtual meeting, online gaming session, or chat session. Accordingly, system 400 can be configured to select one or more activity templates 514, 516, 518, or 520 and generate a notification for output that is provided to at least one user 102*a/b/c*.

The notification can include multiple output templates and/or multiple suggested actions or activities that correspond to the detected shared event. For example, at least one suggested action can include providing a link to, or otherwise enabling, users 102*a/b/c* to: launch an example social media application to tag users participating in the coffee shop discussion or to tag users participating in the online activity session; launch an image/video application that allows sharing of certain digital content with the other users; launch an example chat/virtual meeting application that allows a user to instantiate private chat sessions or private meeting notifications; launch an example internet data sharing application that allows a user to provide certain digital content accessible from online resources to the other users; or launch a calendar application to instantiate a calendar event that can include one or more of the other users.

In some implementations, suggested actions or activities associated with a first activity template can be included within, or also associated with, a second activity template that is different from the first activity template. For example, suggested activities of template 514 can be included within at least one or all of templates 516, 518, or 520. Likewise, suggested activities of: 1) template 516 can be included within at least one or all of templates 514, 518, or 520; 2) template 518 can be included within at least one or all of templates 514, 516, or 520; and 3) template 520 can be included within at least one or all of templates 514, 516, or 518. Accordingly, with regard to FIG. 5, each example suggested activity depicted as being included within a particular activity template can also be included within any other activity template 514, 516, 518, and 520.

The following are example actionable suggestions that can be provided for output to at least one user 102*a/b/c* through a notification generated by system 400. In some implementations, the notification is generated in response to system 400 detecting the occurrence of a shared event based, at least in part, on signal analysis functions performed by system 400.

The example actionable suggestions can include: 1) a group of friends/users having dinner together and system 400 analyzes attribute data associated with the shared dinner event to automatically suggest to pay and/or split the restaurant bill using a payment service application accessible from user device 104*a/b/c*; 2) in a shared event, one of the participants/users is searching for information on the internet and system 400 detects that a particular web search is being performed and automatically suggests to share the internet data or web search results to other users 102*a/b/c* associated with the shared event; and 3) a group of users are going to the cinema jointly and system 400 detects that one of the attendants/user searched for movie show times of a particular movie being shown at a theater and automatically suggests to share interesting bits of information/internet data about the movie, for example, after the movie has ended. In particular, if after the movie one of the users 102*a/b/c* searched for details about an actor, the user could be prompted or asked by system 400 if the user desires to share a particular interesting piece of information with other users of the group.

The example actionable suggestions can further include: 4) a group of users 102*a/b/c* are attending a party and system 400 analyzes calendar events, or email/messaging communications stored in each user device 104*a/b/c* to detect that a first user is attending the same party/social event as other users in the group and automatically suggests to tag other users in pictures, suggests to contribute to the party music playlist, suggests to share the party music playlist with other users, and/or suggests to share recipes from the snacks that were prepared for the party/social event; 5) a group of users are in the same general area and digital images, videos, or photos captured by a user device of a user in the group are geo-tagged and scanned by system 400 and system 400 automatically suggests that the user share captured digital image/video with other users in the group; and 6) an online gaming session in which data transmissions associated with the session are received and analyzed by system 400 to detect that users 102*a/b/c* are each associated with the same gaming session and system 400 automatically suggests to set up a dedicated chat channel for at least two users in the session.

The example actionable suggestions can still further include: 7) a video conference or virtual meeting and system 400 scans/analyzes data attributes associated with the virtual meeting to determine that at least two users 102*a/b/c* are each associated with the same online meeting and automatically suggests to share meeting notes, suggests to share screens during the meeting, and/or suggests to add action items from the meeting to the users to-do list or instantiate a calendar event to capture the action; 8) a group of users 102*a/b/c* are in the same general area, such as having a discussion in a coffee shop, and system 400 automatically suggests to create a group chat, such as an SMS text-based group chat that includes other users participating in the shared event to enable sharing of digital content via the SMS group chat; and 9) a group of users at a sports activity such as a running event and system 400 analyzes user device location data, GPS data, or proximity data signals to detect that a first user is participating in the same sports activity as other users and system 400 automatically suggests to tag the other users in an example running application or instantiate a group chat session to share digital content with the other users.

Figure 6:
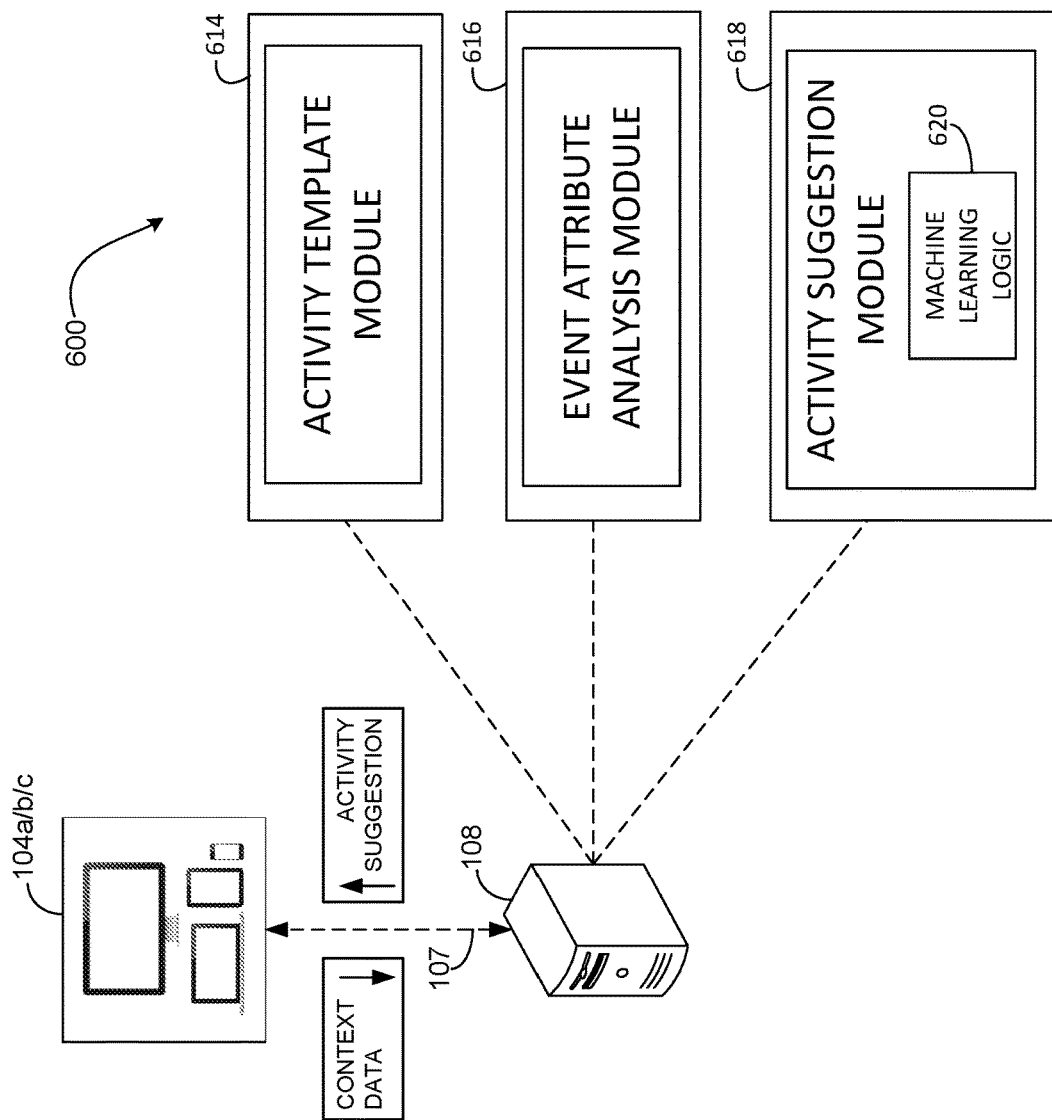
FIG. 6 illustrates a diagram including modules associated with an example computing device of the computing system of FIG. 4.

FIG. 6 illustrates a diagram including module grouping 600 associated with an example computing device of the computing system of FIG. 4. In some implementations, module grouping 200 is associated with server 108 of system 400 and, for example, can be disposed within server 108 or can include independent computing devices that collectively are coupled to, and in data communication with, server 108. Module grouping 600 generally includes activity template modules 614, event attribute analysis module 616, and activity suggestion module 618.

In some implementations, activity template module 614 can include template repository 410. Hence, as indicated above, template repository 410 can reside in an example storage medium of activity template module 614. In some implementations, each of the output activity templates described above with reference to FIG. 5 can be stored within, and accessible from, activity template module 614 and/or template repository 410. Accordingly, system 400 can access a variety of output templates from activity template module 614 to generate a notification for output to user device 104*a/b/c* that includes a particular output template.

In general, much like system 100, system 400 can be implemented, in part, by execution of program code in the form of an executable application, otherwise known as an "app," that can be launched or executed from user device 104*a/b/c*. Upon execution of the application program code, the app can then establish a data connection with server 108 to transmit data signals 107 to server 108 as well as receive data signals 107 from server 108. In some implementations, once launched from an example user device 104*a/b/c*, system 400 can be granted certain permissions by users 102*a/b/c*. The permissions can cause system 400 to, for example, have access to data associated with one or more other application programs or apps stored within a memory unit of user devices 104*a/b/c*.

In some implementations, system 400 receives, through signals 107, data that indicates a current context of users 102*a/b/c*. For example, the current context of users 102*a/b/c* can be a physical environment 406*a/b*, a virtual environment 406*a/b*, or a mixed environment 406*a/b*. In some implementations, event attribute analysis module 616 can be associated with, or disposed within, event detection module 118 describe above with reference to FIG. 1 and FIG. 2. Hence, after receiving a current context of certain users 102*a/b/c*, server 108 of system 400 can use event attribute analysis module 616 to analyze one or more data signals that reference attributes of a particular shared event detected by event detection module 118.

In some implementations, example attributes of a detected shared event of a particular type can include the relative location of the shared event, the time and date of the occurrence of the shared event, a particular venue associated with the shared event, ambient noise levels associated with the shared event; or parameter values of data signals being transmitted from computing devices which are associated with the shared event. In general, data referencing an attribute of a shared event or activity can include a variety of parameter signals that can be analyzed to discern a particular characteristic or attribute that is either unique to, or generally associated with, the shared event or activity.

Event attribute analysis module 616 can be configured to access and analyze data signals 107 associated with certain application programs of user device 104*a/b/c*. Responsive to the data signal analysis, system 400 can detect or determine that a shared event is either occurring in real-time or has occurred during a past time period. More particularly, responsive to the data signal analysis, system 400 can determine particular attributes or characteristics associated within the shared event that can be used, processed, or further analyzed to generate a notification for output. The notification for output can be generated using a particular output template that is associated with the particular type of the shared event.

Activity suggestion module 618 can also receive and process a variety of different data signals 107 transmitted by user device 104*a/b/c* during execution of certain application programs stored on the user devices. In some implementations, system 400 can provide several available data signals 107 transmitted by user device 104*a/b/c* to activity suggestion module 618. Activity suggestion module 618 can use the data signals 107 to determine and/or select a particular output template including multiple activity suggestions based, in part, on the detected shared event type and/or one or more attributes of the detected event. In some implementations, activity suggestion module 618 can be configured to access module 614 to select, from among multiple output templates that are each associated with a different type of shared event, a particular output template associated with the particular type of shared event that event detection module 118 has determined is presently occurring or has occurred.

In general, modules 614, 616 and 618 cooperate to: 1) analyze parameter values associated with data signals of a user device 104*a/b/c,* 2) identify a particular output template from among multiple output templates in template repository 410, and 3) generate a notification that includes a particular output template that includes one or more actionable suggestions for activities reasonably related to the particular type of shared event.

In some implementations, certain parameter values can be processed and analyzed by machine learning logic 620 of activity suggestion module 618. Machine learning logic 620 can be used to train probability models associated with activity suggestion module 618. The probability models can be used to determine a probability that a selected output activity template has a threshold association with a detected shared event of a particular type. For example, machine learning logic 620 can receive and monitor data signals 107 that correspond to example click-through rates associated with a particular output activity template selected to be provided as output to user device 104*a/b/c*.

For instance, system 400 can generate a notification for output using meal activity template 514. User input to user device 104*a/b/c* can indicate that user 102*a/b/c* selected, clicked-through, or otherwise executed an actionable suggestion included in template 514. In particular, user 102*a/b/c* may have selected the actionable suggestion in template 514 when the user is known by system 400 to be dining at Restaurant X. Hence, if user 102*a/b/c* selects or clicks-through a particular actionable suggestion included in template 514 while dining, or having dined at an earlier time period, at restaurant X, then machine learning logic 620 can use the signal data as a positive use case for refining or training an example probability model.

In some implementations, module 618 and/or machine learning logic 620 can include at least one probability module that utilizes program code, such as machine learning algorithms, and that receives and analyzes multiple data signals 107 associated with application programs of user device 104*a/b/c*. The probability module can be used to develop predictive template models that determine, within a certain degree of accuracy, a particular output activity template to be selected. In some implementations, based on outcomes calculated by the predictive template models, a probability metric can be generated that indicates the probability that a particular output template has a reasonable association to a detected shared event.

In some implementations, at least one machine-learning algorithm associated with module 618 or logic 620 can receive data referencing multiple attributes associated with a detected shared event or activity event. During execution of the at least one machine-learning algorithm, the multiple attributes can be utilized by, for example, module 618 to train a predictive template model used by system 400 to identify a particular output template to be provided to user device 104*a/b/c*. In some implementations, the template model can be trained to predict/identify the particular output template in response to a probability metric associated with activity suggestions exceeding a threshold probability metric.

Accordingly, system 400 can be programmed/trained to select an output template having certain actionable suggestions based on a threshold characteristic of a probability metric. In general, the probability metric can correspond to a likelihood that a user 102*a/b/c* will select, click-through or otherwise execute an actionable suggestion included within a particular output template. Hence, the likelihood that an actionable suggestion associated with a particular output template will be selected by a user can increase based on the determined probability metric exceeding a particular threshold. In some implementations, system 400 can determine the likelihood, i.e., generating the probability metric, in a variety of ways, including application of the variety of machine learning principles and threshold triggers discussed above with reference to FIG. 1 and FIG. 2.

FIG. 7 is a flow diagram of an example process for actionable suggestions of one or more activities. At block 702 of process 700, an indication is received that event detection module 118 has determined that a shared event of a particular type is presently occurring or has occurred. In some implementations, system 400 can receive, from user device 104a, data referencing an attribute associated with the detected shared event. In some implementations, event detection module 118 can also receive context data associated with the shared event that indicates a particular type of the shared event. For example, the particular type can be a shared event associated with a meal activity event type, a physical activity event type, a social activity event type, or any other general activity event type. In one implementation, context data and attribute data can indicate, for example, that Alice and Bob are having dinner at Morton's Steakhouse on a Friday night around 8 pm eastern standard time (EST).

At block 704, system 400 selects a particular output template from among multiple output templates that are each associated with a different type of shared event. In particular, the selected particular output template can be associated with the particular type of shared event that event detection module 118 has determined is presently occurring or has occurred. As discussed above, system 400 can use machine-learning algorithms to train predictive template models that can be used to select an output template having certain actionable suggestions based on a threshold characteristic of a probability metric. The probability metric can correspond to a likelihood that Alice will select, click-through or otherwise execute an actionable suggestion included within the selected particular output template.

At block 706, system 400 generates a notification for output using at least (i) the particular output template associated with the particular type of detected shared event, and (ii) the data referencing the attribute associated with the detected shared event. At block 708 of process 700, system 400 provides, for output to user device 104a/b/c, the notification that is generated using at least (i) the particular output template, and (ii) the data referencing the attribute associated with the shared event of the particular type. For example, system 400 can provide the generated notification to Alice's smartphone, e.g., user device 104a.

As discussed above, data signals 107 associated with context data and attribute data can indicate that Alice and Bob are having dinner at Morton's Steakhouse on a Friday night around 8 pm EST. Hence, the particular output template associated with the particular type of the detected shared event can include meal activity template 514. In some alternative implementations, social activity template 518 and/or other activity template 520 can also be associated with a shared event that includes dinner at Morton's Steakhouse on a Friday night.

In some implementations, when system 400 provides the generated notification to Alice, UI 424 of Alice's smartphone will display a notification that indicates to Alice that an application program associated with system 400 has detected or determined that Alice is having dinner with Bob. Moreover, the notification can include the selected output template and the output template can include multiple actionable suggestions that Alice can select, click-through, or otherwise execute from her smartphone. In some implementations, suggested activities that are selected by Alice can be flagged or identified as additional context data and provided to system 400 as data signals 107. The additional context data can be further identified as positive use case models that are utilized by, for example, machine learning logic 620 to train or further refine various predictive template models.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus.

Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system.

A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 8:
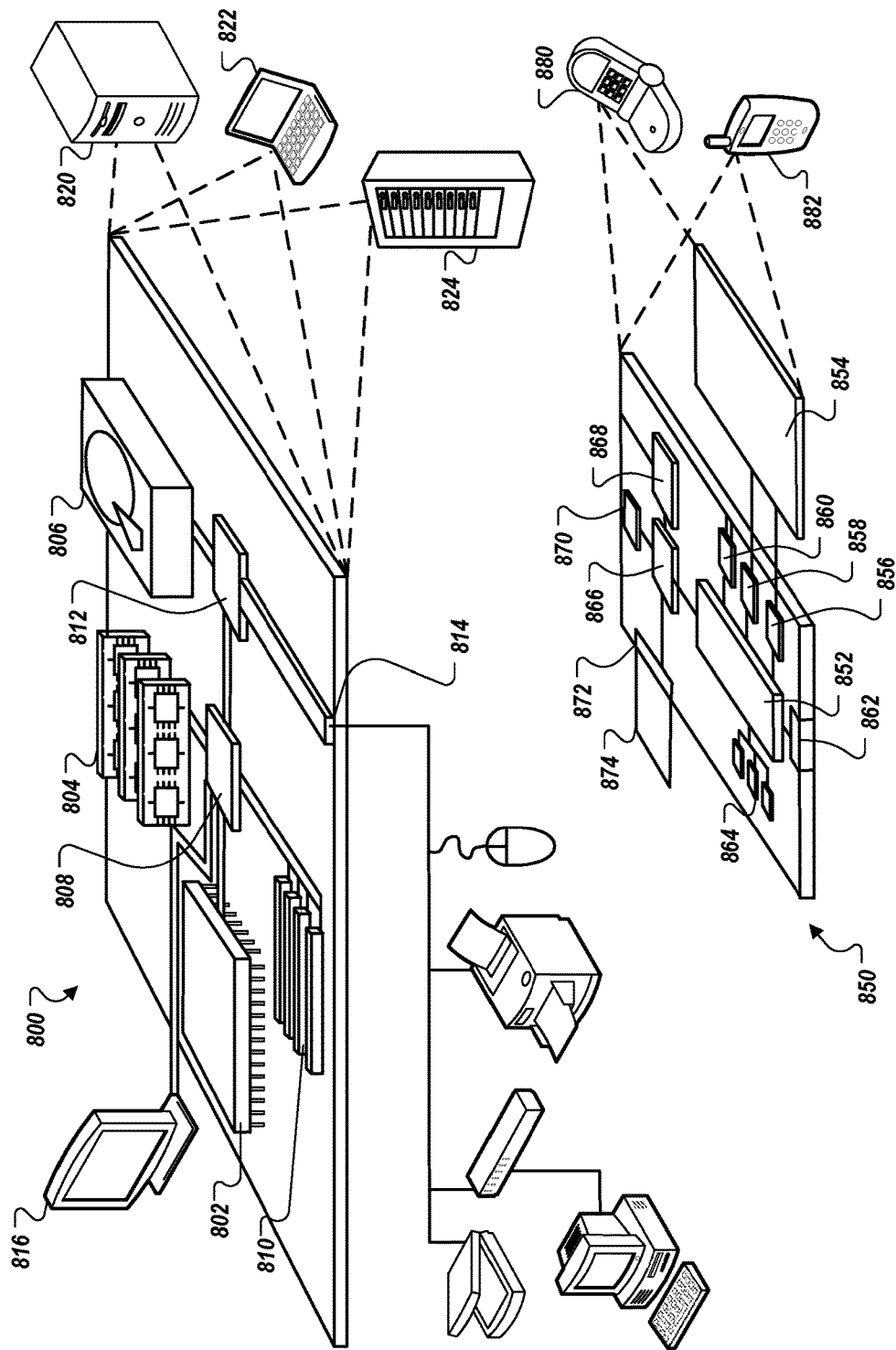
FIG. 8 is a block diagram of a computing system that can be used in connection with computer-implemented methods described in this specification.

FIG. 8 is a block diagram of computing devices 800, 850 that may be used to implement the systems and methods described in this document, either as a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by one or more processors, the method comprising:
    identifying first user data associated with a first user;
    identifying additional user data associated with an additional user;
    determining, based on the first user data and the additional user data, that:
        the first user and the additional user are associated with one another, and
        both the first user and the additional user are scheduled to attend a shared event;
    in response to determining that the first user and the additional user are associated with one another, and that both the first user and the additional user are scheduled to attend the shared event, wherein the first user data includes one or more first messages and the additional user data includes one or more additional messages, and wherein determining that both the first user and the additional user are scheduled to attend the shared event comprises:
        processing one or more of the first messages and one or more of the additional messages; and
        determining, based on one or more of the first messages and one or more of the additional messages, that both the first user and the additional user are scheduled to attend the shared event;
    causing a client application installed on a first user device of the first user to provide a prompt to share media content with at least the additional user via an additional user device of the additional user, wherein the media content is provided based on both the first user and the additional user being scheduled to attend the shared event, wherein the prompt is provided prior to both the first user and the additional user attending the shared event, and wherein the prompt is selectable by the first user via the first user device.

2. The method of claim 1, wherein the shared event is a virtual event.

3. The method of claim 2, wherein the virtual event is a virtual game session, a video streaming session, and/or a virtual meeting session.

4. The method of claim 1, wherein the shared event is associated with a physical environment.

5. The method of claim 1, wherein the media content is associated with a ride sharing application.

6. The method of claim 1, wherein the first user data includes first user sensor data based on output of one or more sensors of the first user device, wherein the additional user data includes additional user sensor data based on output of one or more sensors of the additional user device, and wherein causing the client application installed on the first user device of the first user to provide the prompt to share media content with at least the additional user is based on the first user sensor data and the additional user sensor data.

7. The method of claim 6, wherein the first user sensor data and the additional user sensor data indicate that the first user and the additional user are currently located at the shared event.

8. The method of claim 6, wherein the first user sensor data and the additional user sensor data indicate that the first user is currently proximate to the additional user.

9. The method of claim 6, wherein the first user sensor data and the additional user sensor data indicate one or more shared attributes of a current environment of the first user and a current environment of the additional user.

10. The method of claim 9, wherein the one or more shared attributes are determined based on data exchanged during a virtual game session, a video streaming session, and/or a virtual meeting session.

11. The method of claim 10, wherein an attribute of the one or more shared attributes is of the virtual game session, and the attribute is determined based on a console that is used to engage in the virtual game session.

12. The method of claim 1, wherein selection of the prompt by the first user enables sharing of the media content via a chat channel for at least the first user and the additional user.

13. A system comprising:
    one or more computers comprising one or more processors, and one or more storage devices storing instructions that are operable, when executed by the one or more computers, to cause the one or more processors to perform operations comprising:
        identifying first user data associated with a first user;
        identifying additional user data associated with an additional user;
        determining, based on the first user data and the additional user data, that:
            the first user and the additional user are associated with one another, and
            both the first user and the additional user are scheduled to attend a shared event, wherein the first user data includes one or more first messages and the additional user data includes one or more additional messages, and wherein determining that both the first user and the additional user are scheduled to attend the shared event comprises:
                processing one or more of the first messages and one or more of the additional messages; and
                determining, based on one or more of the first messages and one or more of the additional messages, that both the first user and the additional user are scheduled to attend the shared event;
        in response to determining that the first user and the additional user are associated with one another, and that both the first user and the additional user are scheduled to attend the shared event:

causing a client application installed on a first user device of the first user to provide a prompt to share media content with at least the additional user via an additional user device of the additional user, wherein the media content is provided based on both the first user and the additional user being scheduled to attend the shared event, wherein the prompt is provided prior to both the first user and the additional user attending the shared event, and wherein the prompt is selectable by the first user via the first user device.

14. The system of claim 13, wherein the shared event is a virtual event.

15. The system of claim 14, wherein the virtual event is a virtual game session, a video streaming session, and/or a virtual meeting session.

16. The system of claim 13, wherein the shared event is associated with a physical environment.

* * * * *